United States Patent
Spiers

(10) Patent No.: US 6,969,076 B2
(45) Date of Patent: Nov. 29, 2005

(54) HAND STEERABLE SNOW SCOOTER

(76) Inventor: Ivan Malcolm Spiers, 2014 Donna Dr., Laguna Beach, CA (US) 92651

(*) Notice: Subject to any disclaimer, the term of this patent is extended or adjusted under 35 U.S.C. 154(b) by 0 days.

(21) Appl. No.: 10/817,021

(22) Filed: Apr. 2, 2004

(65) Prior Publication Data
US 2004/0188962 A1 Sep. 30, 2004

Related U.S. Application Data

(63) Continuation of application No. 09/912,919, filed on Jul. 25, 2001, now abandoned, which is a continuation-in-part of application No. 29/133,100, filed on Nov. 22, 2000, now Pat. No. Des. 451,162.

(51) Int. Cl.$^7$ .............................................. B60K 13/00
(52) U.S. Cl. ................................... 280/14.28; 280/7.12
(58) Field of Search ........................... 280/14.28, 7.12, 280/14.25, 16, 20, 22, 28, 87.041, 87.042, 280/205

(56) References Cited

U.S. PATENT DOCUMENTS

| | | |
|---|---|---|
| 1,294,375 A | 2/1919 | Austin |
| 1,524,850 A | 2/1925 | Daam |
| 1,681,297 A | 8/1928 | Lindroos |
| 1,745,643 A | 2/1930 | Roessel |
| 1,945,170 A | 1/1934 | Wetzel |
| 1,968,975 A | 8/1934 | Upsacker et al. |
| 2,101,229 A | 12/1937 | Anderson et al. |
| 2,256,203 A | 9/1941 | Hylan |
| 2,316,272 A | 4/1943 | Meyer |
| 2,359,076 A | 9/1944 | Asbury |
| 2,513,199 A | 6/1950 | Ohlhaver |
| 2,711,326 A | 6/1955 | Sorensen |
| 2,950,924 A * | 8/1960 | Gantz ........................... 280/14 |
| 3,438,643 A | 4/1969 | Spiehs |
| 3,870,330 A * | 3/1975 | Hatano et al. ................. 280/16 |
| 4,037,852 A | 7/1977 | Bayer et al. |
| 4,073,356 A | 2/1978 | Schlicht |
| 4,167,225 A | 9/1979 | Fragoso |
| 4,221,394 A | 9/1980 | Campbell |
| 4,274,647 A | 6/1981 | Drake, Jr. |
| 4,708,353 A | 11/1987 | Evequoz |
| 4,984,648 A | 1/1991 | Strzok |
| 5,090,716 A | 2/1992 | Borden |
| 5,305,846 A | 4/1994 | Martin |
| 5,351,975 A | 10/1994 | Petoud |

(Continued)

FOREIGN PATENT DOCUMENTS

CH        616 854 A5     4/1980

(Continued)

Primary Examiner—J. Allen Shriver
(74) Attorney, Agent, or Firm—Stetina Brunda Garred & Brucker

(57) ABSTRACT

A steerable snow scooter including a bi-laterally pivotable independent forward portion, a hand-operable direction controller, and an independent rearward portion in secured communication with the forward portion and having a support surface upon which to stand. Preferably, the forward portion of the snow scooter is angularly adjustable for selecting approach pitch, while the rearward portion includes a brake member. A preferable direction controller is a stem with a handle bar set for grasping and turning by hand. Most preferably, the stem is in axially pivotally attached communication with the forward portion for selectively moving the stem between a generally vertical and a generally horizontal orientation to thereby permit folding upon the snow scooter for easy carrying and transport. The steerable snow scooter so defined permits the user thereof to easily ride and maneuver over a snow surface for an enjoyable experience.

9 Claims, 3 Drawing Sheets

U.S. PATENT DOCUMENTS

| | | | |
|---|---|---|---|
| 5,470,089 A | 11/1995 | Whitson et al. | |
| 5,516,126 A | 5/1996 | Myers | |
| 6,139,031 A | 10/2000 | Wingard | |
| 6,186,524 B1 | 2/2001 | McQueeny et al. | |
| D451,162 S | 11/2001 | Spiers | |
| 6,317,923 B1 | 11/2001 | Lo | |
| 6,345,678 B1 | 2/2002 | Chang | |
| 6,474,660 B1 * | 11/2002 | Warren | 280/7.12 |
| D467,199 S | 12/2002 | McClure et al. | |
| 2002/0096846 A1 | 7/2002 | Chen | |
| 2002/0109314 A1 | 8/2002 | Chen | |
| 2002/0121757 A1 | 9/2002 | Louh | |
| 2002/0180168 A1 | 12/2002 | Rizk | |
| 2003/0141682 A1 | 7/2003 | Comden | |

FOREIGN PATENT DOCUMENTS

| | | |
|---|---|---|
| FR | 2 609 899 A1 | 1/1987 |
| WO | PCT/US02/23187 | 7/2002 |

* cited by examiner

HAND STEERABLE SNOW SCOOTER

CROSS-REFERENCE TO RELATED APPLICATIONS

This application is a continuation of U.S. Pat. application Ser. No. 09/912,919, filed Jul. 25, 2001, now abandoned, which is a continuation-in-part of U.S. Design application No. 29/133,100, filed Nov. 22, 2000, now U.S. Pat. No. D451,162.

STATEMENT RE: FEDERALLY SPONSORED RESEARCH/DEVELOPMENT (Not Applicable)

BACKGROUND OF THE INVENTION

The present invention is related in general to indoor/outdoor snow-related sport equipment, and in particular to a hand steerable snow scooter having an independent forward portion that is pivotable by choice of a user for steering the snow scooter as the user stands on the rear portion and travels over a groomed and/or non-groomed snow path.

Participation in winter sports is a favorite pastime for many people as they experience downhill and cross-country skiing, ice-skating, playing hockey, ice fishing, and other activities. One such activity that continues to gain significant popularity is snowboarding. Specifically, snowboarding usually occurs on groomed ski slopes where skiers and snowboarders compete for downhill space. A present typical snowboard is constructed as a generally flat, relatively light-weight and smooth polymer board with at least one pocket structure mounted on the top of the board for accommodating the front portion of a booted foot of a user. In operation, the user positions the snowboard at the top of a ski trail, stands on the top of the snowboard with the front portion of one foot in the pocket structure, and thereafter propels and travels down the trail while balancing on the snowboard.

As is apparent from the above description of a usual snowboard, the user thereof must steer the snowboard by shifting body weight and without ski poles or the like as the snowboard travels, many times as high speed, down the ski trail. This situation can be, or become, very difficult for the user to maintain since the user may not have the expertise and/or the ability to favorably enjoy a downhill ride. In view of this snowboard expertise requirement, it is a primary object of the present invention to provide a snow scooter that is hand steerable by the onboard user and more user friendly as an enjoyable sport rider.

Another object of the present invention is to provide a hand steerable snow scooter that preferably has integral therewith a user-operable brake member.

Yet another object of the present invention is to provide a hand steerable snow scooter whose steerability preferably is accomplished with a handlebar type of direction controller.

These and other objects of the present invention will become apparent throughout the description thereof which now follows.

BRIEF SUMMARY OF THE INVENTION

The present invention is a steerable snow scooter including a bi-laterally pivotable independent forward portion for traveling over snow, a hand-operable direction controller in communication with the forward portion, and an independent rearward portion for traveling over snow, said rearward portion in secured communication with the forward portion and having a support surface upon which to stand. Preferably, the forward portion of the snow scooter is angularly adjustable upwardly and downwardly in relation to a horizontal plane for selecting approach pitch on the snow, while the rearward portion includes a brake member for stopping the snow scooter during travel on groomed and/or non-groomed snow, or even travel on a non-snow surface such as upon sand. A preferable direction controller is a stem with a first end thereof attached to the forward portion and a second end thereof bearing a handle bar set for grasping and turning by hand. Most preferably, the first end of the stem is in axially pivotally attached communication with the forward portion for selectively moving the stem between a generally vertical orientation and a generally horizontal orientation to thereby permit folding the stem for easy carrying and transport. The steerable snow scooter so defined permits the user thereof to more easily enjoy over-snow travel and thereby greatly enhance the sporting experience.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
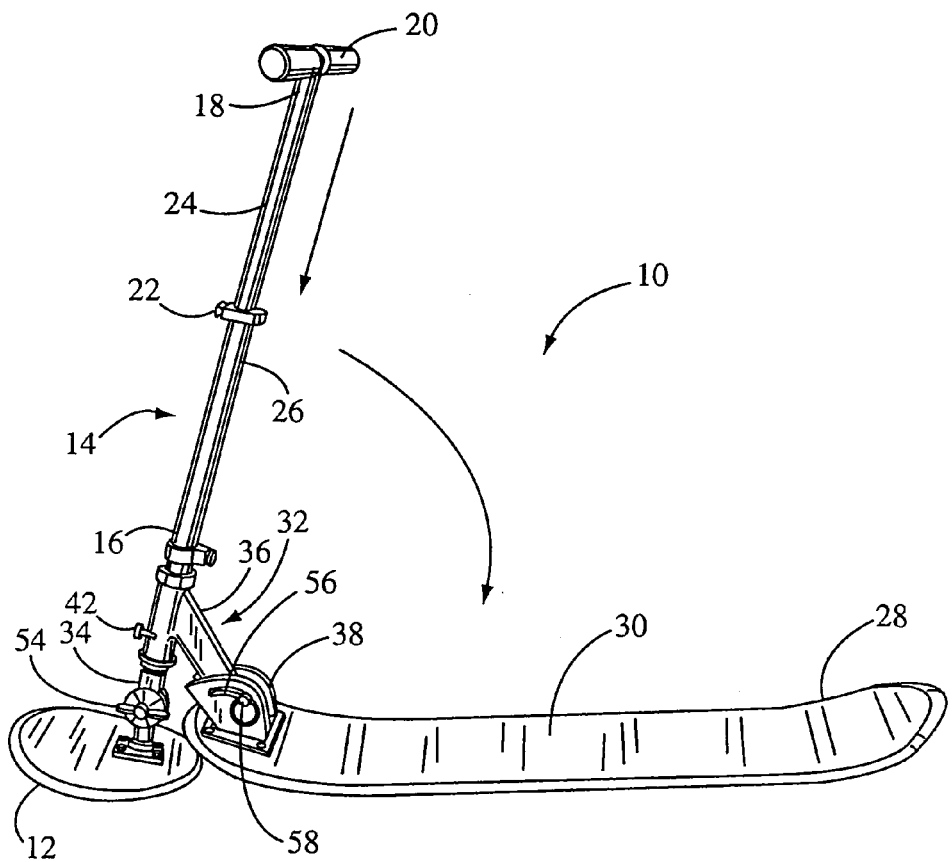
FIG. 1 is a perspective view of a steerable snow scooter in operational configuration.

Referring to FIGS. 1–6, a hand steerable snow scooter 10 is illustrated. The snow scooter 10 has a bi-laterally pivotable independent forward portion 12 for traveling over snow, and a hand-operable direction controller preferably in the form of a telescopically length-adjustable stem 14 with a first end 16 thereof in attached communication with the forward portion 12 of the snow scooter 10 and a second end 18 thereof bearing a handle bar set 20 for grasping. Such telescopic length adjustability of the stem 14 is accomplished with a standard hand-operable setscrew device 22 whereby the top section 24 of the stem 14 can travel within the lower section 26 of the stem 14 when the setscrew device 22 is loosened and retained in a selected telescopic position upon tightening of the setscrew device 22. Finally, the snow scooter 10 includes a rearward portion 28 that has a support surface 30 upon which to stand and is secured to the forward portion 12 with a connector joint 32. The length of the rearward portion 28 preferably is greater that the length of the forward portion 12.

Figure 2:
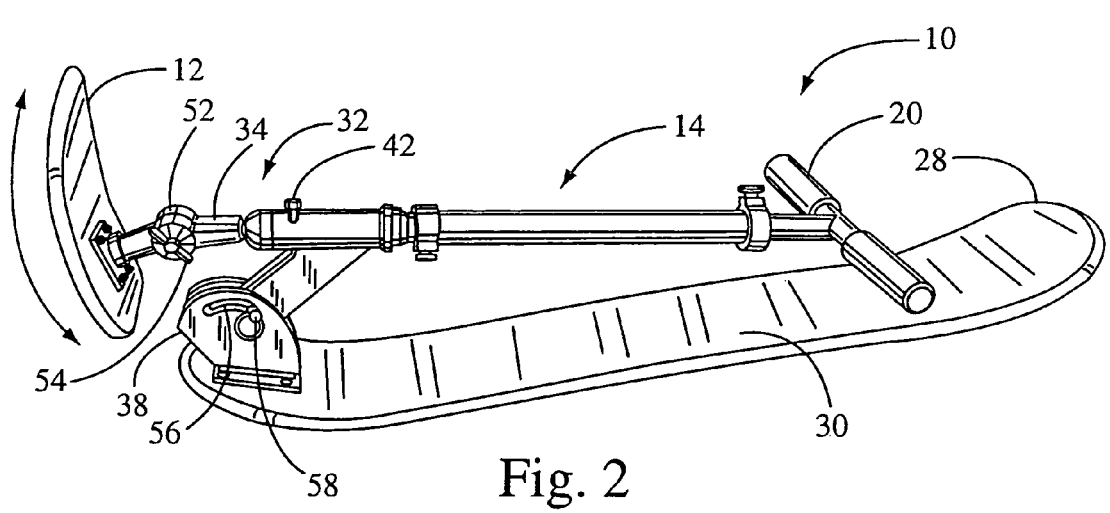
FIG. 2 is a perspective view of the snow scooter of FIG. 1 in collapsed configuration.
Figure 3:
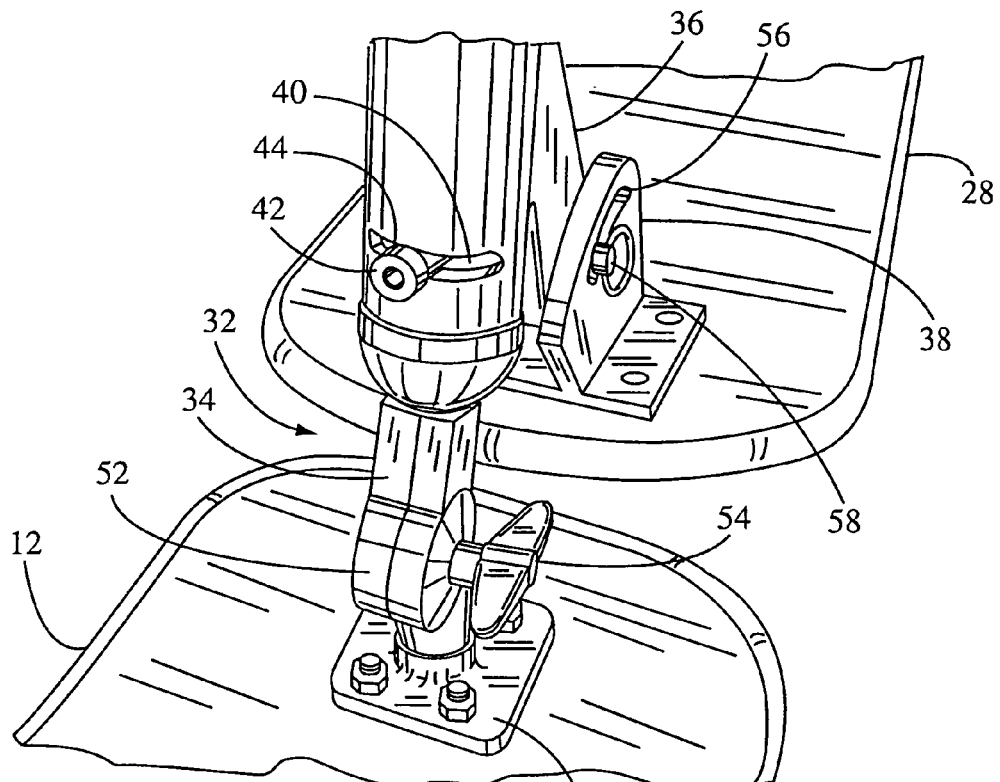
FIG. 3 is a perspective view of one lateral side of adjacent forward and rearward portions of the snow scooter of FIG. 1.
Figure 4:
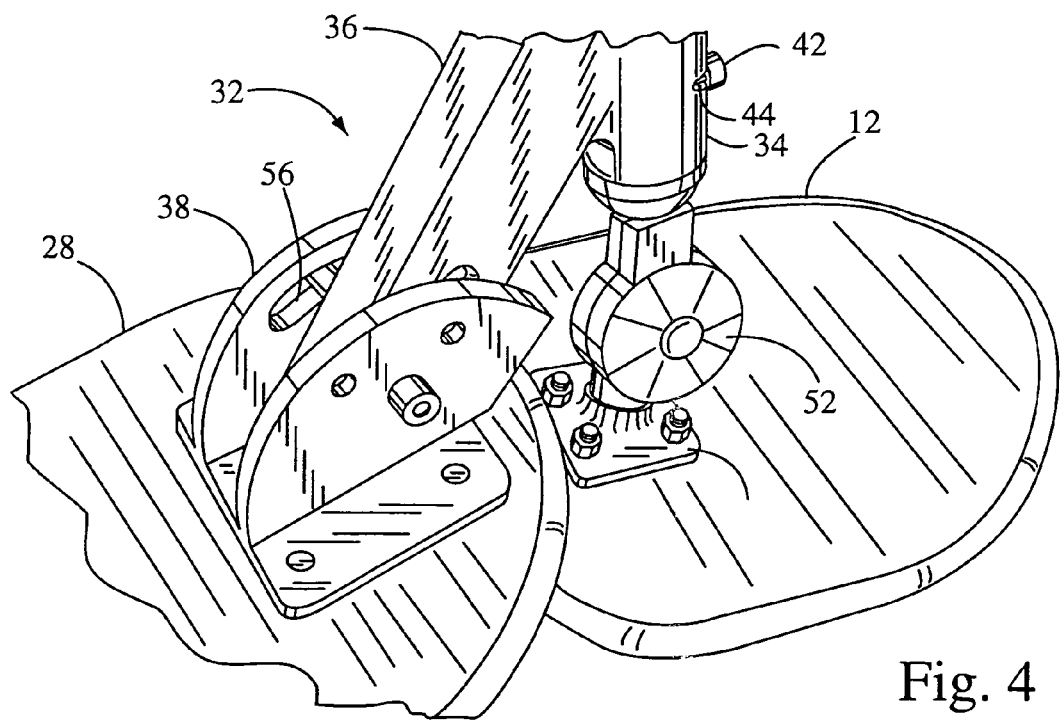
FIG. 4 is a perspective view of the lateral side opposite that shown in FIG. 3.
Figure 5:
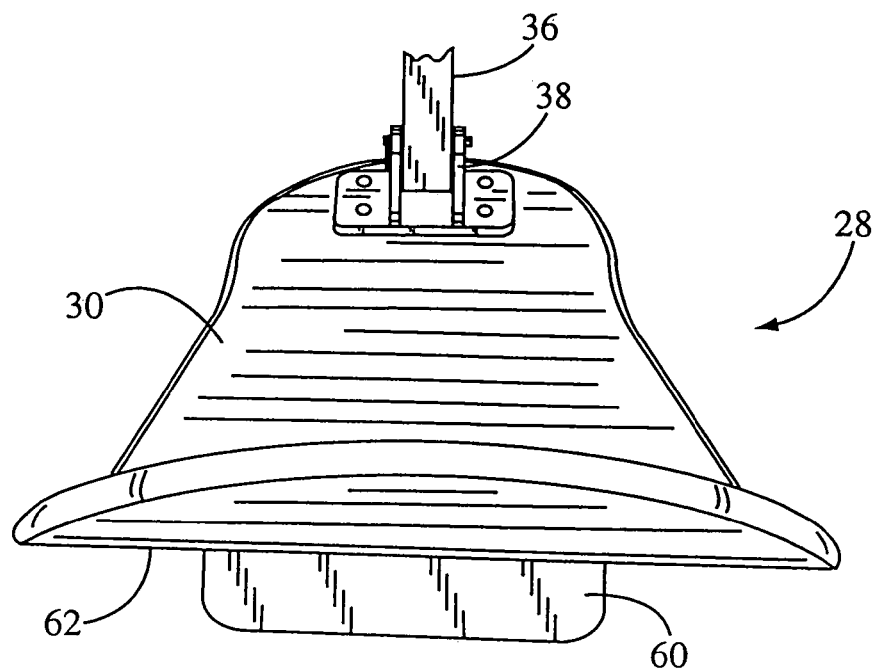
FIG. 5 is a rear perspective view of the rearward portion of the snow scooter of FIG. 1.
Figure 6:
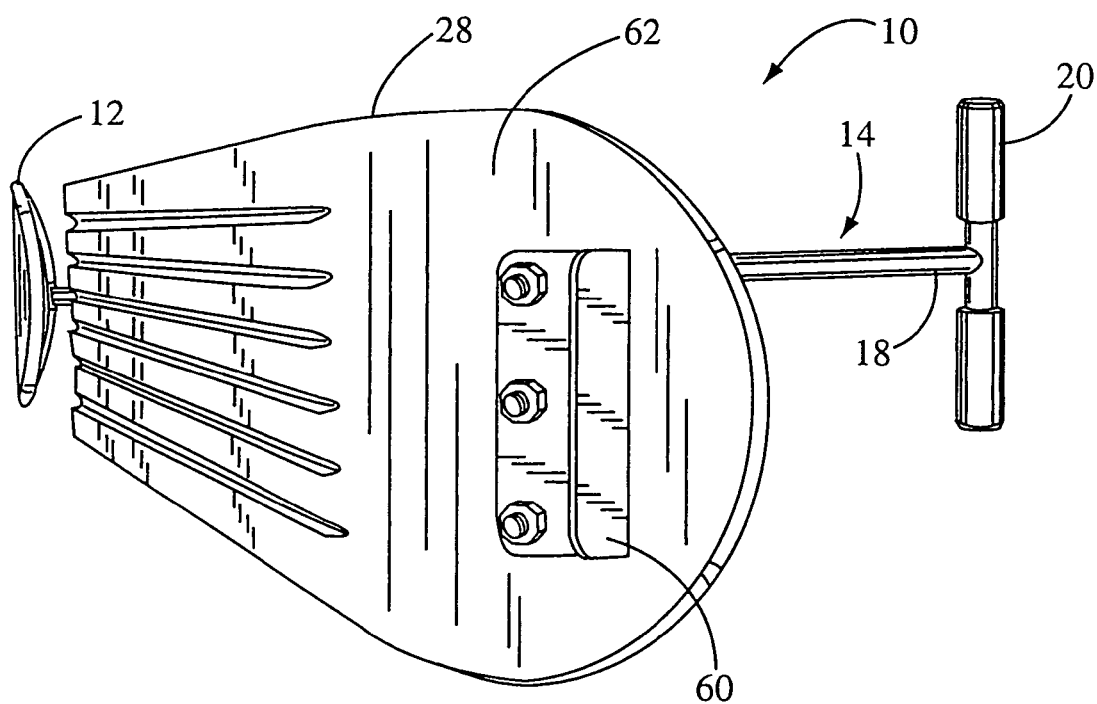
FIG. 6 is a rear perspective view of the snow scooter of FIG. 1 on its side.

As shown clearly in FIGS. 1–4, the connector joint 32 has a first element 34 in attached communication to the forward portion 12 through a base 50 and a second element 36 connected to a slotted pivotal joint 38 attached to the rearward portion 28. A stalk 40 extends from a base 50 into the first element 34 and is secured therein with a pin 42. A stop member, preferably constructed as a limited-length slot 44 within which the pin 42 passes, functions to limit bi-lateral pivotal movement of the forward portion 12. The base 50 preferably includes a standard ratchet assembly (not shown) within a housing 52 and with an externally accessible set lever 54 whereby the forward portion 12 is movable either to a folded position or, as would be recognized by a skilled artisan, angularly adjustable upwardly and downwardly in relation to a horizontal plane to thereby select as desired a forward pitch of the forward portion 12. Finally, as shown in FIG. 2, the pivotal joint 38 accommodates the second element 36 of the connector joint 32 and is provided with an arcuate slot 56 within which a setscrew pin 58 projecting from the second element 36 rides for selectively folding the stem 14 between a generally vertical orientation (FIG. 1) and a generally horizontal orientation (FIG. 2) and thereafter releasably securing the chosen orientation. The preferred snow scooter 10 additionally includes a brake member most preferably in the form of a plate 60 extending downwardly from an aft site of the bottom surface 62 of the rearward portion 28 for travel within snow and stopping the snow scooter 10 by creating resistance within the snow when downward pressure is applied on the support surface 30 above the plate 60.

Operation of the snow scooter 10 generally begins as a user orients the stem 14 in a generally vertical configuration and chooses a desired pitch of the forward portion 12. The user then steps aboard the support surface 30 of the rearward portion 28 and begins travel down a ski trail run. During this travel, the user can determine the direction of the snow scooter 10 by turning the handlebar set 20 which, of course, laterally directs the forward portion 14 and aims the snow scooter 10. Full speed travel is generally achieved by maintaining foot contact at about the forward two-thirds of the top surface 30 such that pressure is not applied over the top of the brake plate 60. Conversely, when slowing or stopping the snow scooter 10 is desired, the user places a foot on the top surface 30 at a site above the brake plate 60 and applies downward pressure, thereby forcing the plate 60 into the snow to create resistance and decrease velocity. In this manner, the user is able to enjoy a snowboarding-type sport while simultaneously having an easy-to-ride snow scooter for enjoyment in navigating a ski-trail run.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A steerable snow scooter comprising:
   a) a bi-laterally pivotable independent forward portion for traveling over snow, and being configured such that a forward pitch angle of the forward portion is angularly adjustable to a chosen orientation in relation to a horizontal plane, the forward portion being further configured such that the forward pitch angle is non-movably securable following angular adjustment thereof into the chosen orientation;
   b) a hand-operable direction controller in communication with the forward portion, said controller comprising a stem with a first end thereof in attached communication with the forward portion and a second end thereof bearing a handle bar set for grasping; and
   c) an independent rearward portion for traveling over snow, said rearward portion in pivotal communication with the stem by a slotted pivotal joint for selectively folding the stem between a generally vertical orientation and a generally horizontal orientation and having a support surface upon which to stand.

2. A steerable snow scooter as claimed in claim 1 wherein the forward portion is a first length and the rearward portion is a second length greater than the first length.

3. A steerable snow scooter as claimed in claim 1 additional comprising a stop member for limiting bi-lateral pivotability of the forward portion.

4. A steerable snow scooter as claimed in claim 1 additionally comprising a brake member for stopping the snow scooter during travel on snow.

5. A steerable snow scooter as claimed in claim 4 wherein the rearward portion has a support surface and the brake member has a brake plate configured to stop the snow scooter by creating resistance within the snow when downward pressure is applied on the support surface in an area above the brake plate such that the brake plate is moved into contact with the snow.

6. A steerable snow scooter according to claim 1, wherein said forward portion is configured in a parabolic shape.

7. The steerable snow scooter according to claim 1, wherein said rearward portion is configured in a parabolic shape.

8. The steerable snow scooter according to claim 1, wherein said rearward portion includes a grooved undersurface.

9. The steerable snow scooter according to claim 1, wherein said stem is configured to be adjustable in length.

* * * * *